United States Patent [19]

Harashima

[11] Patent Number: 5,290,641
[45] Date of Patent: Mar. 1, 1994

[54] METHOD OF CONTROLLING OPERATION OF FUEL CELL POWER SUPPLY

[75] Inventor: Kouichi Harashima, Kawasaki, Japan

[73] Assignee: Fuji Electric Co., Ltd., Kawasaki, Japan

[21] Appl. No.: 886,607

[22] Filed: May 21, 1992

Related U.S. Application Data

[63] Continuation-in-part of Ser. No. 579,601, Sep. 7, 1990, abandoned.

[30] Foreign Application Priority Data

Oct. 6, 1989 [JP] Japan .................................. 1-261352

[51] Int. Cl.⁵ ............................................ H01M 8/04
[52] U.S. Cl. ...................................... 429/17; 429/20; 429/24
[58] Field of Search ............................ 429/17, 20, 24

[56] References Cited

U.S. PATENT DOCUMENTS

3,961,986  6/1976  Waldman .................. 429/17 X
3,973,993  8/1976  Bloomfield et al. ........ 424/17 X Primary Examiner—Prince Willis, Jr.
Assistant Examiner—M. Nuzzolillo
Attorney, Agent, or Firm—Spencer, Frank & Schneider

[57] ABSTRACT

A fuel cell power supply in which the flow rates of reactant gases are set at flow rates required for a steady state operation plus predetermined extra amounts when an output power increase command is issued. This increase in the flow rates of the reactant gases reduces the consumption ratios of the hydrogen and oxygen to values different from those employed in the steady state operation. This makes it possible to compensate an output voltage drop due to a low temperature of the fuel cell during some time period after the command is issued, thus preventing an overload of the fuel cell.

2 Claims, 6 Drawing Sheets

METHOD OF CONTROLLING OPERATION OF FUEL CELL POWER SUPPLY

This application is a continuation-in-part of application Ser. No. 07/579,601 filed Sep. 7th, 1990, now abandoned.

BACKGROUND OF THE INVENTION

1. Field of the Invention

The present invention relates to a method of controlling the operation of a fuel cell power supply, and particularly to a method of controlling the operation of the fuel cell supply when its load is increasing.

2. Description of the Prior Art

Fuel cell power supplies, in general, have a reformed gas supply system, a reactant air supply system, and an inverting system. The reformed gas supply system reforms fossil fuel or hydrocarbon fuel into reformed gas rich in hydrogen, and supplies the reformed gas to the fuel cell. The inverting system inverts direct current power of the fuel cell into alternating current power, and produces it as the output power of the fuel cell.

Figure 1:
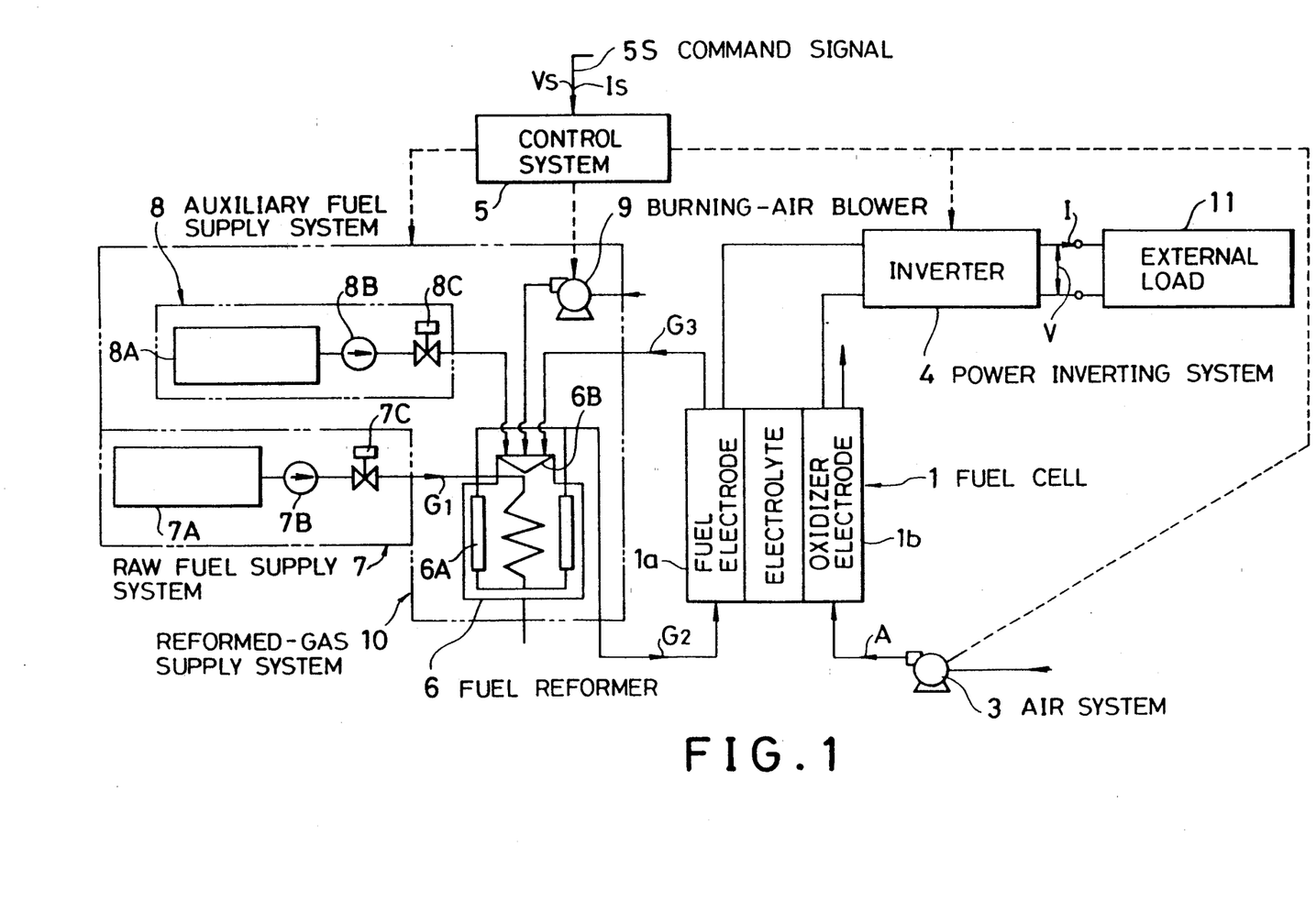
FIG. 1 is a schematic diagram showing an arrangement of a fuel cell supply.

FIG. 1 shows a schematic arrangement of an example of a fuel cell power supply. The power supply comprises a fuel cell 1 consisting of a stack of unit fuel cells; a reformed gas supply system 10 which supplies reformed gas G2 to a fuel electrode 1a of the fuel cell 1; an air system 3 including a blower for supplying reactant air A to an air electrode 1b of the fuel cell 1; and a power inverting system 4 for inverting the generated power of the fuel cell 1 into a form suitable to a load 11, and supplying power to the load 11. The control of the entire system is accomplished according to control signals produced from a control system 5 which receives a command signal 5S that designates an output power of the fuel cell.

The reformed gas supply system 10 comprises a fuel reformer 6 having reform catalyst tubes 6A and a burner 6B; a raw fuel supply system 7 having a raw fuel tank 7A, a raw fuel pump 7B and a control valve 7C; an auxiliary fuel supply system 8 having a fuel tank 8A, a fuel pump 8B and a control valve 8C; and a burning air blower 9. The raw fuel supply system 7 supplies the fuel reformer 6 with raw fuel G1, a mixture of the fossil fuel or hydrocarbon fuel with the predetermined quantity of steam. The fuel reformer 6 reforms the methane or hydrocarbon in the raw fuel into reformed gas G2 rich in hydrogen by using a steam reforming reaction which is an endothermic reaction, and supplies the reformed gas G2 to the fuel cell 1. The heat of reaction is supplied from the burner 6B which burns the off gas G3 of the fuel cell 1 and the auxiliary fuel.

The control for an ordinary load fluctuation in the fuel cell power supply is performed as follows: First, the output current I of the power inverting system 4 is detected. Second, the control system 5 generates control signals on the basis of the difference between the detected output current and a reference current. Finally, the control of the control valves, pumps, and the blowers is carried out by using a current value control that performs feedback control in response to the output current of the power inverting system 4. Thus, the flow rate of the raw gas G1, the amount of steam for the reform, the flow rate of the auxiliary fuel, the flow rate of the off gas G3, the flow rate of the off air, the flow rate of the reformed gas G2, the flow rate of the reactant air A, and so forth are controlled. The reference values of the current value control are set according to a command signal 5S that designates the output power of the power inverting system 4.

A large increase or decrease in the output current, on the other hand, is accomplished by changing a reference value of the current. In this case, although the power inverting system 4 can quickly respond to the command signal 5S for a load increase (in several milliseconds), the fuel cell 1 can only slowly respond to the command because the response is delayed by the responses of the fuel processing system and the air system. The fuel processing system and the air system include chemical reactions involving time delays such as the reform reaction in the response process, and further the transfer of the gases in conduits takes a considerable time. This is the reason why the responses of the fuel processing system and the air system to a load increase command are delayed more than the response of the power inverting system. Furthermore, an increase in the load does not immediately increase the temperature of the fuel cell; it has a time delay. The delay is due to the thermal capacity of the fuel cell, and it takes minutes to hours for the fuel cell to follow the load increase. The time delay causes a problem of an overload. More specifically, in the current value control method, the flow rates of the reactant gases (that is, the flow rates of the reformed gas and the reactant air) are controlled by feeding back the output current. This feedback system, however, involves various time delays as mentioned above, and hence, the fuel cell may suffer from an overload before the flow rates reach the reference values. This will be described in more detail.

Figure 2:
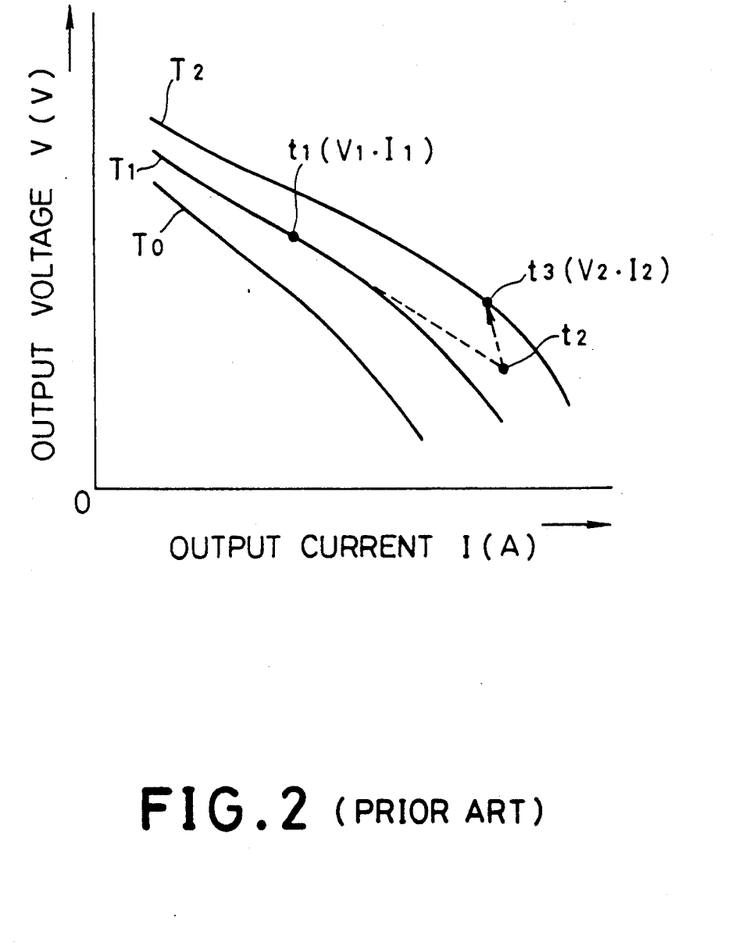
FIG. 2 is a graph illustrating characteristic curves of the output voltage V versus the output current I of a conventional fuel cell power supply.

The output characteristics of the fuel cell 1 have a temperature dependence as shown in the V-I (output voltage V versus output current I) characteristics of FIG. 2. As the temperature decreases, a limit current declines, and the output voltage for the same load current is reduced.

Figure 3:
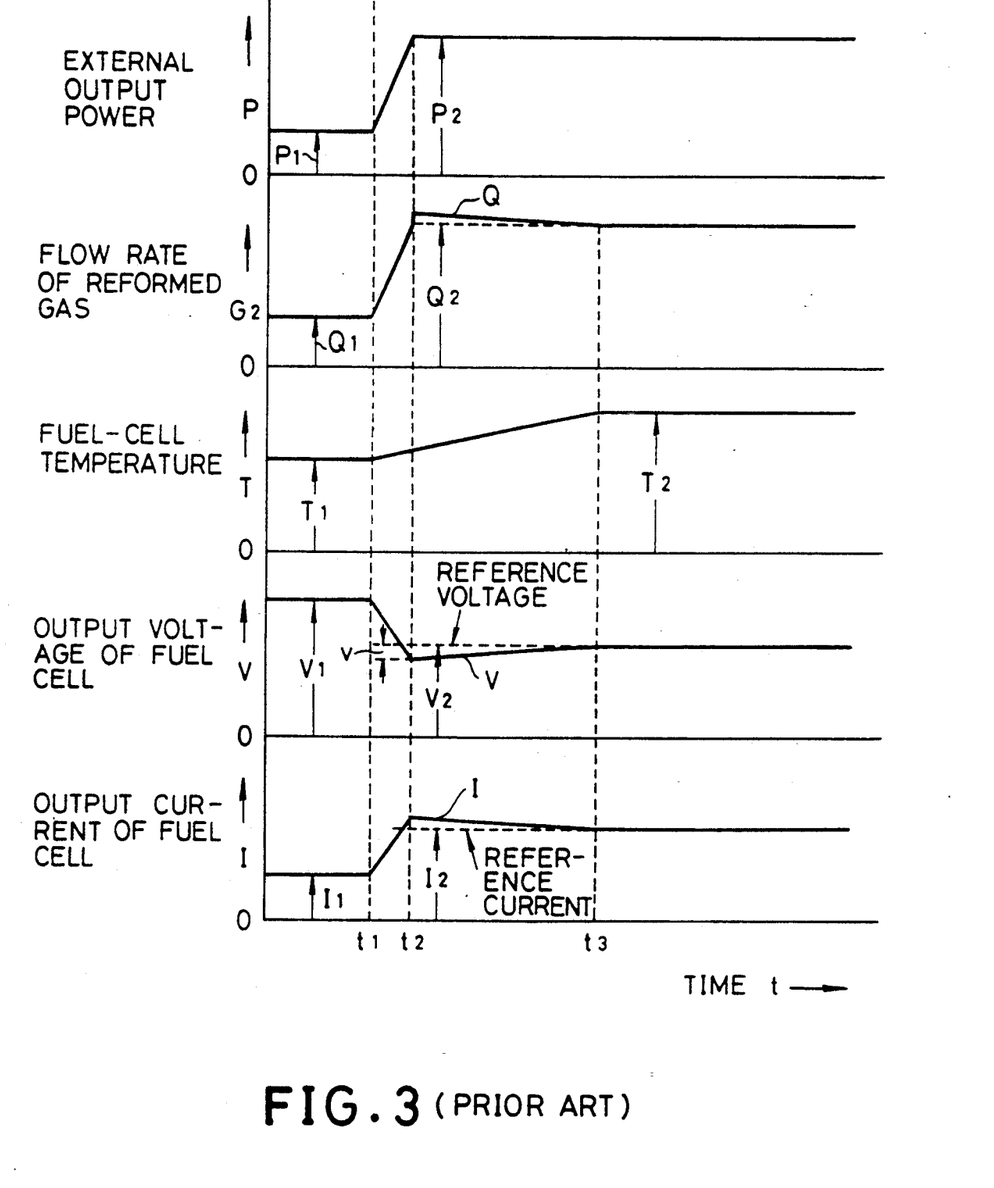
FIG. 3 is a time chart illustrating the conventional control process of the fuel cell power supply.

FIG. 3 is a timing chart illustrating a conventional method of controlling an operation in a load increasing mode. In this mode, it is assumed that the external output P1 (kW) was ordered by a command signal 5S; that the power system has been operating in a steady state in response to the control signal produced from the control system 5 according to the command signal 5S, and has been maintaining the output voltage V1, the output current I1, the reformed gas flow rate Q1, and the fuel cell temperature T1; and that a next command signal 5S is issued at time t1 to increase the reference value of the output power to P2 between times t1 and t2.

The control system 5, receiving the command signal 5S at time t1, supplies the reformed gas supply system 10 with a control signal. This makes the reference flow rate of the reformed gas G2 increase to Q2 at time t2, thereby driving the output voltage V and the output current I of the power inverting system 4 from reference values V1 and I1 toward new reference values V2 and I2. After time t2, the current value control is performed.

The temperature T of the fuel cell 1, however, is lower than a reference temperature T2 corresponding to the reference current I2 until time t3 as shown in FIG. 3. As shown by points t1, t2 and t3 in FIG. 2 which indicate the operation points of the V×I characteristics at times t1, t2 and t3, respectively, the output current I at time t2 is larger than the reference value I2, and the output voltage V at time t2 is smaller than the reference value V2. The flow rate Q of the reformed gas G2, on the other hand, is larger than the reference value Q2' because the control system 5 demands the increase in the reformed gas G2 and the reactant air A by the current value control.

The differences between the actual values and the reference values decrease as the temperature T of the fuel cell 1 approaches the reference temperature T2, and finally, the actual values Q, V and I agree with the reference values Q2, V2 and I2, respectively.

In FIG. 3, typical values are as follows: P1=25 kW(DC); P2=50 kW(DC); Q1=27 $m^3N/h$; Q2=61 $m^3N/h$; T1=177° C.; T2=190° C.; V1=141 V; V2=124 V; v=2 V; I1=178 A; and I2=404 A.

In the conventional method of controlling the operation of the fuel cell described above, there are differences between the actual current I and reference current I2, and the actual voltage V and the reference voltage V2 of the fuel cell 1; the reference values I2 and V2 being generated by the control system 5 in response to the output power increasing command.

As a result, the fuel cell 1 is subjected to an overload condition until the temperature T of the fuel cell 1 reaches the reference temperature T2 at time t3. Thus, the fuel cell 1 experiences the overload condition each time a large increase (or decrease) of the output power is repeated in the fuel cell power supply. This quickens the deterioration of the characteristics of the unit cells constituting the fuel cell stack. The deterioration of the characteristics is particularly noticeable in unit fuel cells through which the reactant gas such as reactant air does not flow cell. The operation of the fuel cell power supply may be hampered by degradation of such unit cells. It is a critical problem that governs the life of the fuel cell.

SUMMARY OF THE INVENTION

It is therefore an object of the present invention to improve the life of a fuel cell by preventing the deterioration of characteristics of unit cells by avoiding an overload that may occur during a load increase.

To solve the above problem, in a first aspect of the present invention, there is provided a method of controlling the operation of a fuel cell power supply having a fuel cell, a reformed gas supply system for supplying the fuel cell with reformed gas, an air system for supplying the fuel cell with reactant air, a power inverting system for inverting the output of the fuel cell and supplying the inverted output power to an external load, and a control system for controlling these systems in response to a command externally applied to increase or decrease the output power of said fuel cell, the method comprising the steps of:

calculating a reference current and a reference voltage in accordance with a reference power designated by the command to increase the output power, on the basis of I-V characteristic curves of the fuel cell, which have been stored in the control system beforehand;

calculating first reference flow rates of the reformed gas and the reactant air to be supplied to the fuel cell in accordance with the reference current;

adding to the first reference flow rates, predetermined amounts of the reformed gas and the reactant air, respectively, to obtain second reference flow rates of the reformed gas and the reactant air to be supplied to the fuel cell;

increasing the flow rates of the reformed gas and the reactant air by controlling the reformed gas supply system and the air system in accordance with the second flow rates;

detecting flow rates of the reformed gas and the reactant air to find a first timing when the detected flow rates reach the second reference flow rates;

detecting an output current, an output voltage and a temperature of the fuel cell;

controlling the fuel cell, the reformed gas supply system, the air system, and the power inverting system in accordance with the second reference flow rates and the reference power provided by the command from the first timing to a second timing when the temperature of the fuel cell reaches a predetermined steady state operation temperature corresponding to the reference current; and controlling the fuel cell, the reformed gas supply system, the air system, and the power inverting system in accordance with the first reference flow rates, the reference current, and the output current of the fuel cell after the second timing.

In the second aspect of the present invention, there is provided a method of controlling the operation of a fuel cell power supply having a fuel cell, a reformed gas supply system for supplying the fuel cell with reformed gas, an air system for supplying the fuel cell with reactant air, a power inverting system for inverting the output of the fuel cell and supplying the inverted output power to an external load, and a control system for controlling these systems in response to a command externally applied to increase or decrease the output power of the fuel cell, the method comprising the steps of:

calculating a reference current and a reference voltage in accordance with a reference power designated by the command to increase the output power, on the basis of I-V characteristic curves of the fuel cell, which have been stored in the control system beforehand;

calculating first reference flow rates of the reformed gas and the reactant air to be supplied to the fuel cell in accordance with the reference current;

adding to the first reference flow rates, predetermined amounts of the reformed gas and the reactant air, respectively, to obtain second reference flow rates of the reformed gas and the reactant air to be supplied to the fuel cell;

increasing the flow rates of the reformed gas and the reactant air by controlling the reformed gas supply system and the air system in accordance with the second flow rates;

detecting flow rates of the reformed gas and the reactant air to find a first timing when the detected flow rates reach the second reference flow rates;

detecting an output current, an output voltage and a temperature of said fuel cell;

controlling the fuel cell, the reformed gas supply system, the air system, and the power inverting system in accordance with the second reference flow rates and the reference voltage from the first timing to a second timing when the temperature of the fuel cell reaches a predetermined steady state operation temperature corresponding to the reference current, so that the output voltage is maintained at the reference voltage; and controlling the fuel cell, the reformed gas supply system, the air system, and the power inverting system in accordance with the first reference flow rates, the reference current, and the output current of the fuel cell after the second timing.

The present invention is arranged in view of the fact that the output voltage of a fuel cell increases in proportion to a rise in the temperature of the fuel cell, and in inverse proportion to the consumption ratios of the hydrogen and oxygen in the reactant gases. In other words, the output voltage drop of the fuel cell due to the low temperature of the fuel cell can be compensated by reducing the consumption ratios of the hydrogen and oxygen below the consumption ratios employed in the steady state operation by supplying the fuel cell with predetermined amounts of excess reformed gas and reactant air.

When the excess reformed gas and reactant air are supplied and the output power is maintained constant by a power value control which will be described later, the rise in the output voltage enables the output current of the fuel cell to drop, which makes it possible to prevent the fuel cell from overloading. In addition, switching the power value control into the current value control when the temperature of the fuel cell reaches the steady state operation temperature corresponding to the reference current makes it possible to maintain the output voltage at the reference voltage, the output current at the reference current, and the flow rates of the reactant gases at the first reference flow rates, thus achieving a transition to an effective power supply operation. As a result, the output voltage drop owing to the low temperature of the fuel cell can be compensated by the voltage rise produced by the increased amounts of the reactant gases, and by thus reducing the consumption ratio of the hydrogen or oxygen below those required in the steady state operation. Therefore, overload of the fuel cell and deterioration of the unit cells owing to the repetition of the overload can be avoided. This serves to improve the life of the fuel cell.

Furthermore, according to the second aspect of the present invention, the output voltage of the fuel cell is detected, and the flow rates of the reactant gases are controlled in response to the detected voltage until the temperature of the fuel cell reaches the steady state operation temperature so that the output voltage is maintained at the reference voltage. This makes it possible for the actual output voltage and current to approach more closely to their respective reference values. This is because, by thus controlling, the quantities of the reactant gases can be controlled in response to the difference between the actual output voltage and its reference value. Therefore, the load follow-up characteristic of the fuel cell is improved, and the consumption of reactant gases is decreased in comparison with the first aspect of the present invention.

The above and other objects, effects, features and advantages of the present invention will become more apparent from the following description of the embodiments thereof taken in conjunction with the accompanying drawings.

DETAILED DESCRIPTION OF PREFERRED EMBODIMENTS

The invention will now be described with reference to the accompanying drawings.

[A] FIRST EMBODIMENT

Figure 4:
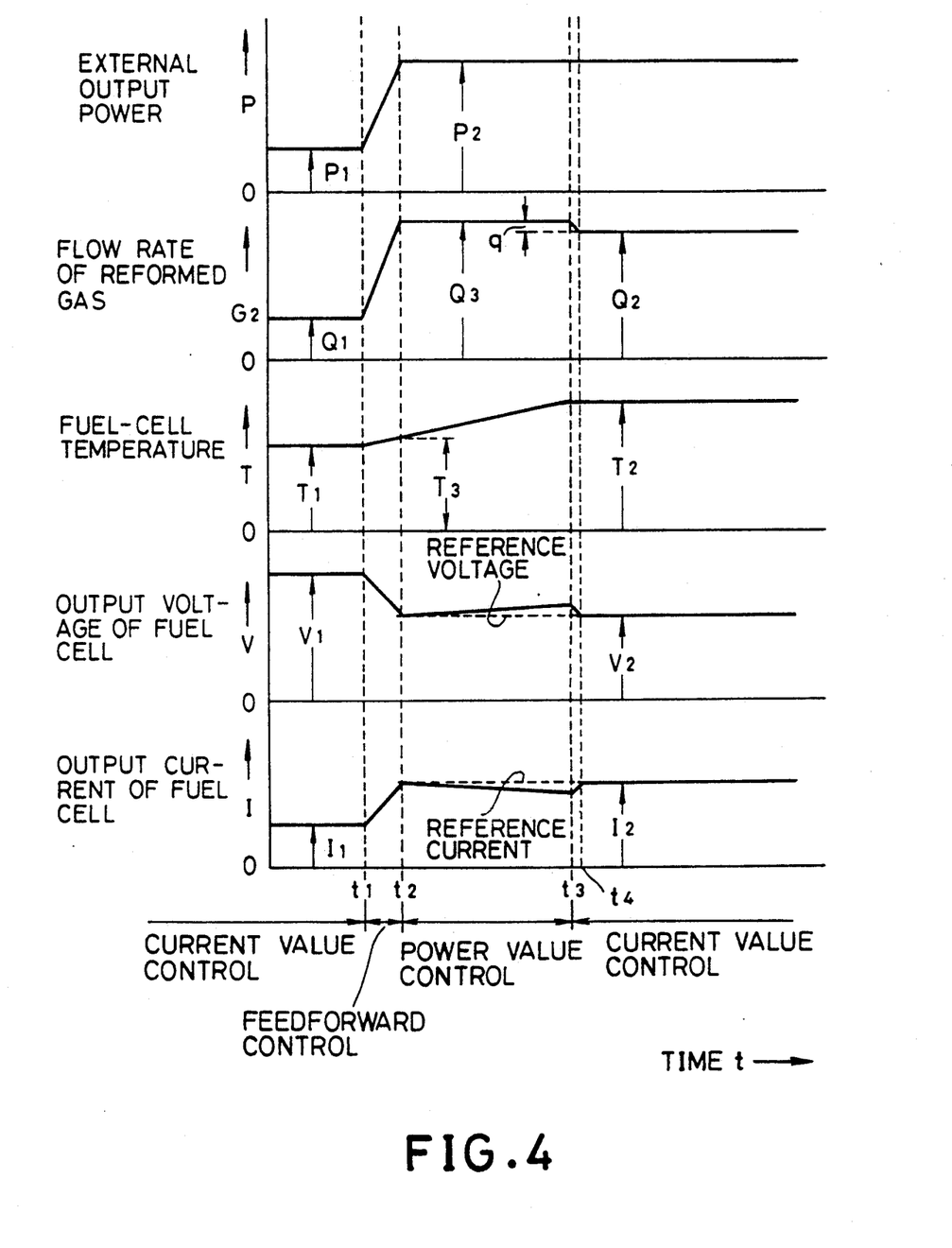
FIG. 4 is a time chart illustrating the operation control process of the fuel cell power supply according to a first embodiment of the present invention.

FIG. 4 is a time chart illustrating the operation control process of the fuel cell power supply of a first embodiment of the present invention. Referring to the arrangement in FIG. 1, the operation control method of the first embodiment will now be described.

Before time t1 in FIG. 4, the fuel cell power supply of FIG. 1 is controlled by current value control, and is operated in a steady state. In the current value control, the reactant gas flow rates are set in accordance with the current value of a fuel cell 1 as in the conventional system.

Figure 5:
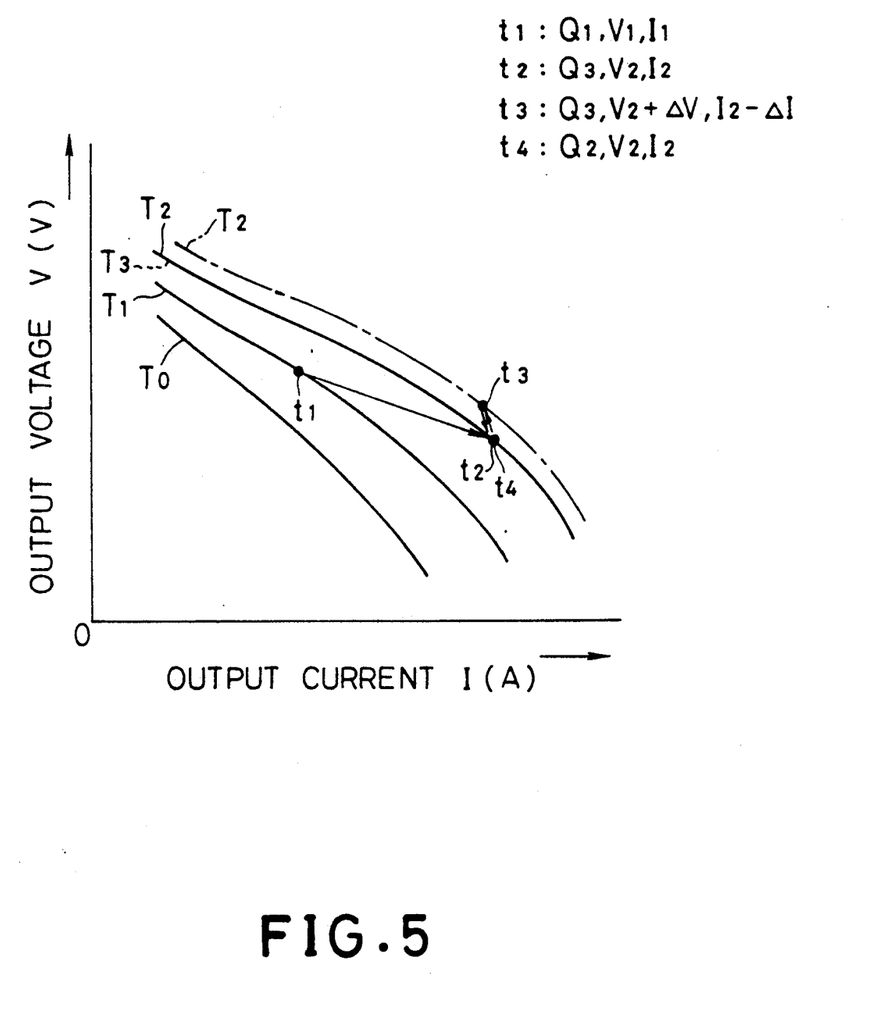
FIG. 5 is a graph illustrating characteristic curves of the output voltage V versus output current I of the fuel cell power supply of the operation in accordance with the present invention.

At time t1 in FIG. 4, a command signal 5S is applied to a control system 5 to raise the output power of a power inverting system 4 from P1 to P2. The control system 5 receives the command signal 5S, and calculates a reference voltage V2 and a reference current I2 corresponding to the output power P2. Here, the reference voltage V2 and the reference current I2 are determined as a crosspoint of a typical I-V curve associated with temperature T1 as shown in FIG. 5 and an output power curve associated with power P2. In this case, the following relationship is satisfied.

$$P2 = I2 \times V2$$

The typical I-V curves are stored in a memory of the control system 5 so that the reference current I2 can be obtained referring to the I-V curves.

Subsequently, the control system 5 calculates a reference flow rate Q2 of reformed gas G2 and a reference flow rate Q2' of reactant air on the basis of the reference current I2. More specifically, the flow rates Q2 and Q2' of the reformed gas G2 and the reactant air A are determined by the following procedures.

First, the flow rate Qa of the reformed gas G2 per cell is determined by the following equation when the gas consumption ratio = gas availability = 100%.

$$Qa \ (l/hour \times cell) = (22.4 \times 3600 \times 12)/(96500 \times n)$$

where n is a molar equivalent, that is, 2 for $H_2$ and 4 for $O_2$. Second, the flow rate Qb of reformed gas per cell is determined by $$Qc = Qa/(P_{H2} \times U_{H2})$$

where $P_{H2}$ is a partial pressure of $H_2$, and $U_{H2}$ is a coefficient of utility (availability) of $H_2$. Third, the flow rate Qc of reactant air per cell is determined by $$Qc = Qa/(P_{O2} \times U_{O2})$$

where $P_{O2}$ is a partial pressure of $O_2$, and $U_{O2}$ is a coefficient of utility of $O_2$.

The flow rates Qb and Qc are values under a standard state, and so temperature and pressure correction must be performed, thereby giving the reference flow rate Q2 of the reformed gas and the reference flow rate Q2' of the reactant air. Thus, when the load of the fuel cell is to be changed, the reference flow rates Q2 and Q2' of the reformed gas and the reactant air, respectively, are calculated on the basis of the reference current value I2 and typical I-V curves of the fuel cell, which have been stored in the control system 5 beforehand.

Subsequently, the control system 5 adds to the reference flow rates Q2 and Q2' a predetermined extra amount q of the reformed gas and a predetermined extra amount q' of the reactant air to obtain reference flow rates Q3 and Q3', respectively, which are used by feedforward control between times t1 and t2. The extra amounts q and q' of the additional gases are determined considering the characteristics of the gas consumption ratios versus output voltage depending on the type and structure of the fuel cell 1, and the temperature dependence of the V-I characteristics. For example, the extra flow rates q and q' are set at 5% –10% of the normal flow rates Q2 and Q2' of the reactant gases. The extra amounts q and q' thus determined are applied to the arithmetic portion of the control system 5, and are set in the form of functions or constants, thus giving the reference flow rates Q3 and Q3' of the reactant gases. Although these values Q2, Q3 and q, and Q2', Q3' and q' are determined independently with regard to the reformed gas and the reactant air, only the values Q2, Q3 and q of the reformed gas are depicted in FIG. 4.

The reference flow rate Q3 (=Q2+q) of the reformed gas G2 is supplied to the reformed gas supply system 10 with a control signal commanding it to supply. The control system further commands the air system 3 to supply the quantity Q3' (=Q2'+q') of the reactant air A. Thus, between time t1 and t2, feedforward control is carried out to increase the reactant gas flow rates to Q3 and Q3'. The feedforward control is performed independently of the current value of the fuel cell 1.

When the predetermined extra amounts q and q' match the quantity required to compensate the voltage drop v (=V2−V as shown in FIG. 3) that occurs when the temperature T of the fuel cell 1 is lower than a steady state operation temperature T2, the output voltage V of the fuel cell 1 will temporarily become equal to the reference voltage V2, and the output current I will also temporarily become equal to the reference current I2 at time t2 when the flow rate Q of the reformed gas G2 reaches the reference flow rate Q3, and the cell temperature reaches T3. This relationship is indicated by I-V curves associated with temperatures T2 and T3 as shown in FIG. 5. In FIG. 5, the I-V curves associated with temperatures T2 and T3 are the same curve, although the temperatures T2 and T3 are different. Thus, this I-V curve shows that the voltage drop v is compensated by the extra amounts q and q'.

Here, the steady state operation temperature refers to a saturation temperature depending on the output current of the cell. The steady state operation temperature T2 is the temperature which the fuel cell reaches when it is operated in the steady state at the output current I2. The relationship between the output current and the saturation temperature has been obtained at a cell sample test, and has been inputted to the control system 5 in advance.

As discussed before, when the cell temperature is low, the voltage decreases and the current increases as shown in FIG. 3 because the fuel cell operates at higher gas availability than in the steady state operation. In this embodiment, since the extra reactant gases are provided, this will not occur.

After that, at time t2, the control system 5 switches its control from the feedforward control to a power value control. The term "power value control" means the following: When the load is increased and the cell temperature is rising from time t2 to time t3, the output voltage is also increasing, and the output current is declining. In the course of this, the power inverting system 4 monitors only a power value so that the output power of the inverting system 4 is maintained at P2 as shown in FIG. 4, while the output current is not detected, and hence, is not fed back to the control system 5, even though the output voltage V increases and the output current I declines as the temperature of the fuel cell elevates.

After the cell temperature reaches the steady state operation temperature T2, the cell current value I is linked with the gas flow rates Q via the control system 5. Thus, the current value control is carried out instead of the power value control after time t3. In the current value control, the gas flow rates are determined on the basis of the cell current value as explained above.

During the power value control from time t2 to t3, the overcompensation of the voltage takes place as the temperature T of the fuel cell 1 increases towards the steady state operation temperature T2. In other words, the output voltage V exceeds the reference voltage V2 by a small amount, and the output current I becomes lower than the reference current I2 by a small amount as the temperature T rises. As a result, when the power value control is switched to the current value control at time t3 when the temperature T of the fuel cell 1 reaches the steady state operation temperature T2, the fuel cell 1 can readily enter into steady state operation wherein the reference flow rates Q2 and Q2', the reference voltage V2, and the reference current I2 are realized.

In FIG. 4, typical values are as follows: P1=25 kW(DC); P2=50 kW(DC); Q1=27 m$^3$N/h; Q2=61 m$^3$N/h; Q3=65 m$^3$N/h q=4 m$^3$N/h; T1=177° C.; T2=190° C.; V1=141 V; V2=124 V; I1=178 A; I2=404 A; the time period between t1 and t2 is 3 sec.; and that between t2 and t3 is 15 min. The output powers P1 and P2 are expressed in terms of the output powers of the fuel cell. Actual output power of the inverting system 4 takes lower values because of the inverter loss and the losses of auxiliary machines such as pumps and blowers. For example, under the conditions that the efficiency of the inverter system 4 is 95% and the losses of the auxiliary machines are 3 kW(AC) or 5 kW(AC), the output power of the inverter system 4 becomes 20.8 kW(AC) (=25×0.95−3) when the output power of the fuel cell is 25 kW(DC), and 42.5 kW(AC) (=50×0.95−5) when the output power of the fuel cell is 50 kW(DC).

[B] SECOND EMBODIMENT

Figure 6:
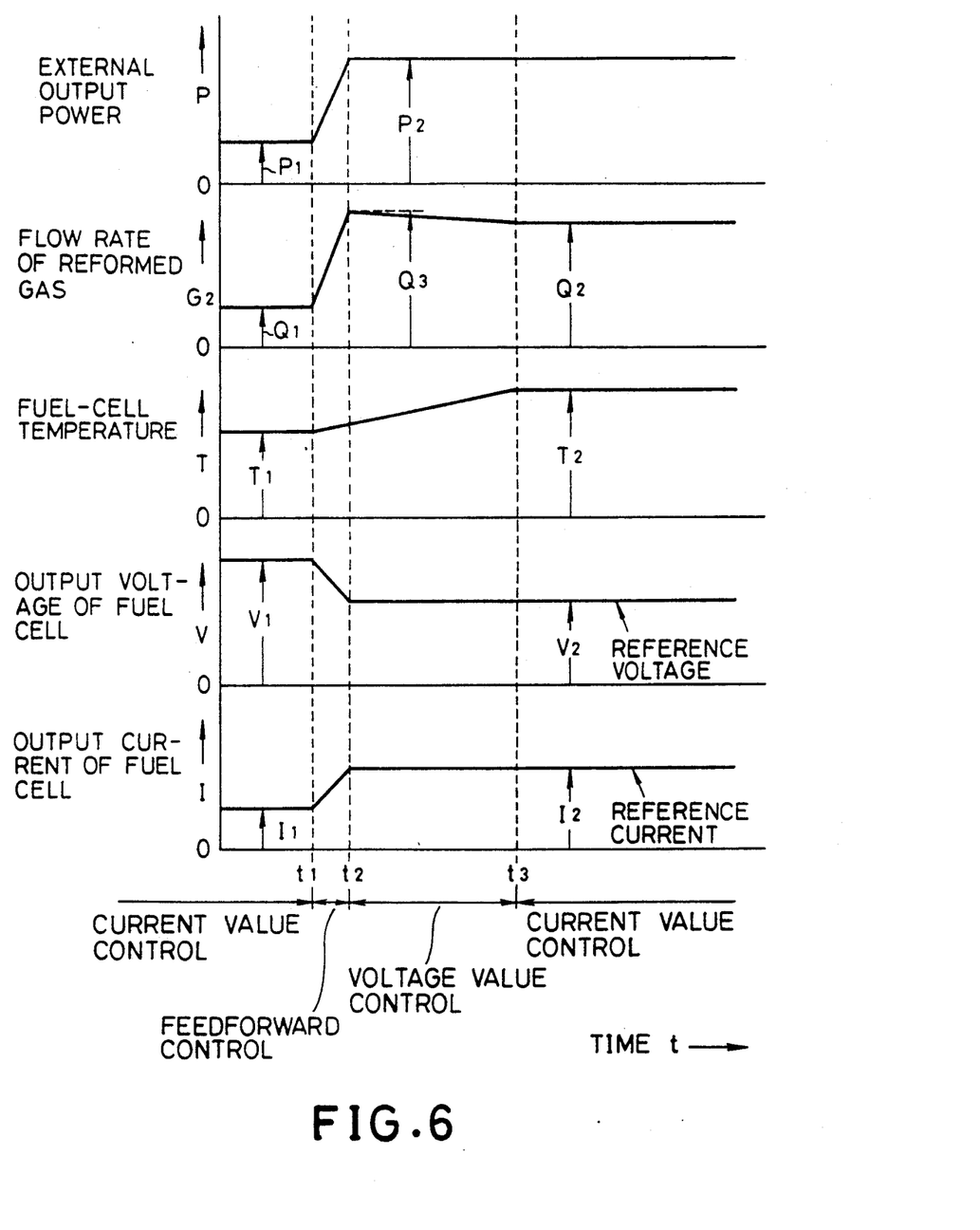
FIG. 6 is a time chart illustrating the operation control process of the fuel cell power supply according to a second embodiment of the present invention.

FIG. 6 is a time chart illustrating the operation of a second embodiment of the present invention. The second embodiment differs from the first embodiment in that in the second embodiment, the feedforward control of a fuel cell 1 is switched into voltage value control based on the output voltage V of the fuel cell 1 at time t2 when the flow rate of reformed gas increases to Q3. Here, the voltage value control means that the power inverting system 4 of FIG. 1 detects the output voltage thereof, and feeds back the detected output voltage to a control system 5 so that the output voltage is controlled in accordance with a reference voltage V2. As a result, control to maintain the output voltage V at the reference voltage V2 is carried out until the temperature T of the fuel cell 1 reaches a steady state operation temperature T2 at time t3. After time t3, current value control is carried out instead of the voltage value control in a manner similar to that of the first embodiment. By this, the output current I of the fuel cell 1 is also maintained at a reference value I2, which means that the output voltage V and current I are simultaneously maintained at the respective reference values V2 and I2 after time t2. This makes it possible to greatly improve the load response characteristics of the power supply, thereby reducing the consumption of the reactant gases.

In FIG. 6, typical values are as follows: P1=25 kW(DC); P2=50 kW(DC); Q1=27 m$^3$N/h; Q2=61 m$^3$N/h; Q3=65 m$^3$N/h; T1=177° C.; T2=190° C.; V1=141 V; V2=124 V; I1=178 A; and I2=404 A.

The dependence of the output voltage of the fuel cell on the fuel-consumption ratio exhibits different characteristics with the hydrogen consumption ratio and the oxygen consumption ratio. Consequently, it is preferable that the control for increasing the reactant gases be performed in such a manner that the maximum voltage compensation effect can be achieved.

Although specific embodiments of a method of controlling operation of a fuel cell power supply arranged in accordance with the present invention have been disclosed, it is not intended that the invention be restricted to either the specific configurations or the uses disclosed herein. Modifications may be made in a manner obvious to those skilled in the art. Accordingly, it is intended that the invention be limited only by the scope of the appended claims.

What is claimed is:

1. A method of controlling the operation of a fuel cell power supply having a fuel cell, a reformed gas supply system for supplying the fuel cell with reformed gas at a flow rate Q, an air system for supplying the fuel cell with reactant air at a flow rate Q', a power inverting system for inverting the output of the fuel cell and supplying the inverted output power to an external load, and a control system for controlling these systems in response to a command externally applied to increase or decrease the output power of said fuel cell, said method comprising the steps of:

calculating a reference current and a reference voltage in accordance with a reference power designated by said command to increase the output power on the basis of I-V characteristic curves of said fuel cell store in said control system;

calculating a first reference flow rate $Q_2$ of said reformed gas and a first reference flow rate $Q_2'$ of said reactant air to be supplied to said fuel cell in accordance with said reference current;

adding to said first reference flow rates $Q_2$ and $Q_2'$ a predetermined amount q of said reformed gas and a predetermined amount g' of said reactant air, respectively, to obtain a second reference flow rate $Q_3$ of said reformed gas and a second reference flow rate $Q_3'$ of said reactant air to be supplied to said fuel cell;

increasing said flow rates Q and Q' of said reformed gas and said reactant air by controlling said reformed gas supply system and said air system in accordance with said second reference flow rates $Q_3$ and $Q_3'$;

detecting the flow rates Q and Q' of said reformed gas and said reactant air respectively to find a first timing when said detected flow rates reach said second reference flow rates $Q_3$ and $Q_3'$ respectively;

detecting an output current, an output voltage and a temperature of said fuel cell;

controlling said fuel cell, said reformed gas supply system, said air system, and said power inverting system in accordance with said second reference flow rates $Q_3$ and $Q_3'$ and said reference power provided by said command from said first timing to a second timing when the temperature of said fuel cell reaches a predetermined steady state operation temperature corresponding to said reference current; and controlling said fuel cell, said reformed gas supply system, said air system, and said power inverting system in accordance with said first reference flow rates $Q_2$ and $Q_2'$, said reference current, and the output current of said fuel cell after said second timing.

2. A method of controlling the operation of a fuel cell power supply having a fuel cell, a reformed gas supply system for supplying the fuel cell with reformed gas at a flow rate Q, an air system for supplying the fuel cell with reactant air at a flow rate Q', a power inverting system for inverting the output of the fuel cell and supplying the inverted output power to an external load, and a control system for controlling these systems in response to a command externally applied to increase or decrease the output power of said fuel cell, said method comprising the steps of:

calculating a reference current and a reference voltage in accordance with a reference power designated by said command to increase the output power on the basis of I-V characteristic curves of said fuel cell stored in said control system;

calculating a first reference flow rate $Q_2$ of said reformed gas and said reactant air to be supplied to said fuel cell in accordance with said reference current;

adding to said first reference flow rates $Q_2$ and $Q_2'$ a predetermined amount q of said reformed gas and a predetermined amount q' of said reactant air, respectively, to obtain a second reference flow rate $Q_3$ of said reformed gas and a second reference flow rate $Q_3'$ of said reactant air to be supplied to said fuel cell;

increasing said flow rates Q and Q' of said reformed gas and said reactant air respectively by controlling said reformed gas supply system and said air system in accordance with said second reference flow rates $Q_3$ and $Q_3'$ respectively;

detecting the flow rates Q and Q' of said reformed gas and said reactant air respectively to find a first timing when said detected flow rates reach said second reference flow rates $Q_3$ and $Q_3'$;

detecting an output current, an output voltage and a temperature of said fuel cell;

controlling said fuel cell, said reformed gas supply system, said air system, and said power inverting system in accordance with said second reference flow rates $Q_3$ and $Q_3'$ and said reference voltage from said first timing to a second timing when the temperature of said fuel cell reaches a predetermined steady state operation temperature corresponding to said reference current, so that said output voltage is maintained at said reference voltage; and controlling said fuel cell, said reformed gas supply system, said air system, and said power inverting system in accordance with said first reference flow rates $Q_2$ and $Q_2'$, said reference current, and the output current of said fuel cell after said second timing.

* * * * *